No. 782,656. PATENTED FEB. 14, 1905.
H. F. HOBEL.
PROCESS OF MANUFACTURING STORAGE BATTERY OR ACCUMULATOR ELECTRODES.
APPLICATION FILED OCT. 29, 1904.
2 SHEETS—SHEET 1.
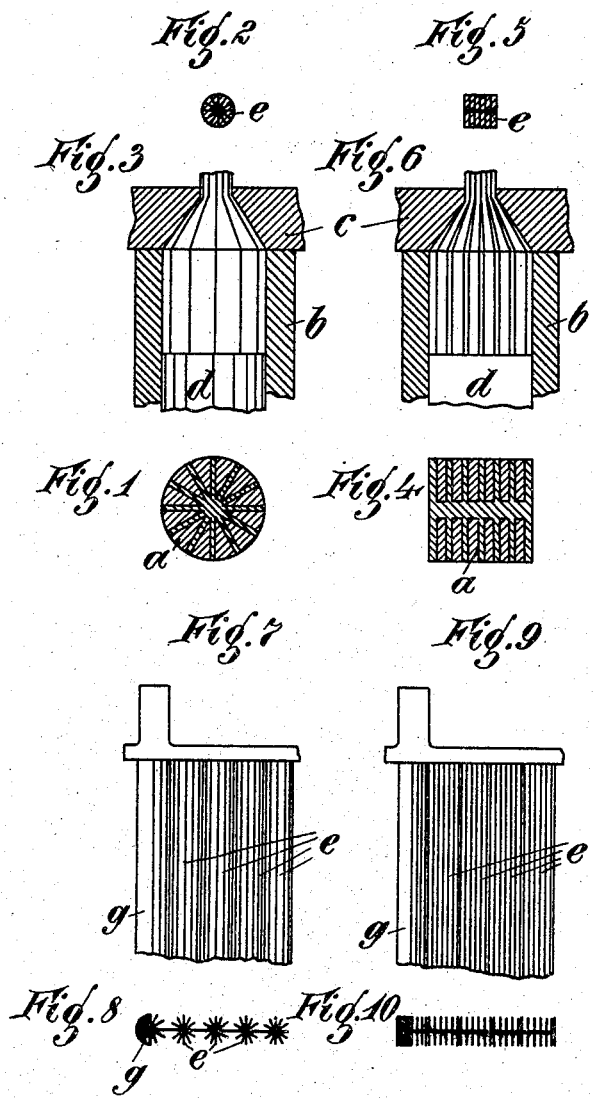
Witnesses:
Inventor:
Heinrich Franz Hobel
by Georgii & Massie
Attorney

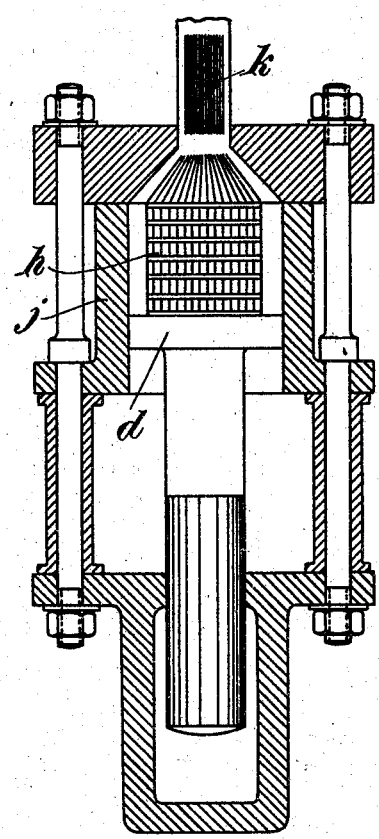
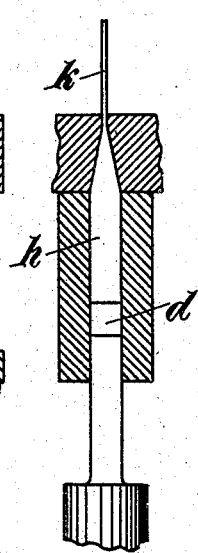
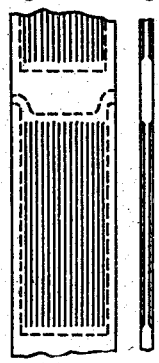
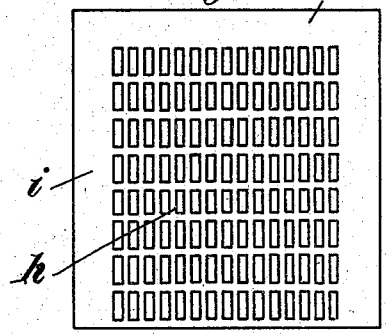

No. 782,656.

Patented February 14, 1905.

UNITED STATES PATENT OFFICE.

HEINRICH FRANZ HOBEL, OF BERLIN, GERMANY.

PROCESS OF MANUFACTURING STORAGE-BATTERY OR ACCUMULATOR ELECTRODES.

SPECIFICATION forming part of Letters Patent No. 782,656, dated February 14, 1905.

Application filed October 29, 1904. Serial No. 230,546.

*To all whom it may concern:*

Be it known that I, HEINRICH FRANZ HOBEL, engineer, a subject of the Emperor of Austria-Hungary, residing at 8 Schlegelstrasse, Berlin, Germany, have invented a new and useful Improved Process of Manufacturing Storage-Battery or Accumulator Electrodes, of which the following is a specification.

This invention has for its object improvements in the manufacture of storage-battery or accumulator electrodes, the active surfaces of which are considerably increased by the reduction or compression of the strips or plates forming the electrodes.

According to the present invention the reduction is effected by compression through a smooth die of a press, thereby rendering possible the production of surfaces of various shapes, according to whether it is desired to manufacture heavy positive or light negative electrodes for stationary or portable batteries, plates of a perfectly homogeneous character being produced, which are therefore very strong.

By the improved process bars or strips of the desired section of lead or other metal or alloy are reduced in size while retaining their original shape in cross-section by passing them in the direction of their middle line through dies of a press. During this compression the thick bodies in question become stretched out into thinner or more compact bodies of the same shape in cross-section.

According to this invention the pressure on the electrode-body is exercised uniformly over its entire surface, so that bodies of any cross-section—for instance, of star-shaped cross-section—retain the shape of their cross-section during compression, whereas if they are pressed between flat surfaces or drawn through rotating pressure-rolls they lose their original shape in cross-section.

The improved process is illustrated in the accompanying drawings, of which—

Figure 1 shows a circular bar of lead with star-like ribs the spaces of which are filled with a filling material. Fig. 2 shows the same bar of lead after its passage through a press, shown diagrammatically in Fig. 3, and provided with a die with a smooth interior. Figs. 4, 5, and 6 are similar views for a bar of square cross-section with ribs on two opposite sides. Figs. 7 and 8 and also Figs. 9 and 10 show storage-battery plates made from a number of compressed bars or strips of the same cross-section as those shown in Figs. 2 and 5, respectively. Figs. 11 to 16 are illustrative of how according to this process it is possible for complete electrodes to be manufactured in one piece.

As indicated by the shading in Figs. 1 to 4, the spaces between the ribs are filled before compression with a filling material which preferably has the same resistance under pressure as that of the body itself. It is advisable for this purpose to use oxid of lead, lead powder, or the like, so that the plates are pasted. The lead bodies $a$ are then placed in the die of a hydraulic or other press. The die is preferably constituted by two parts $b$ and $c$. The compression-space of the part $b$ has the cross-section of the bar as originally cast and forms a guide for the die-plunger $d$. The compression-space of the part $c$ tapers from the cross-section of the cast bar $a$ to the desired cross-section of the electrode $e$. If it is desired to press ribbed bodies, such as shown in Figs. 1 and 4, through a ribbed mouthpiece of a corresponding section, a very much higher pressure would be required than that necessary in the present process, and owing to their small size the ribs of the mouthpiece would be unable to withstand the pressure and would very soon break.

The compressed strips $e$, as shown in Figs. 7 to 10, are inserted into or soldered to a strong lead frame $g$. This work can be obviated by using large cast plates $h$. As will be seen from Figs. 13 and 14, the cast plate has on all sides an edge $i$ free from ribs and of such width that after passing through the press $j$ the finished storage-battery plate $k$ will have solid strong edges, Figs. 11 and 12. As a result of the passage through the mouthpiece the size in cross-section, Fig. 14, is reduced many times both with regard to width and thickness, so that a plate is produced of a few millimeters thickness and several centimeters wide, as shown in Figs. 15 and 16. From the comparatively thick ribs fine ribs are produced, while the single transverse portions form, on the contrary, solid intermediate pieces between the longitudinal ribs of the strip. From these solid intermediate parts, as well as from the side edges, the edges and connecting-tongues of the plate are cut, as shown in dotted lines in Fig. 15.

The number of plates produced at each filling of the press will depend upon the size of the latter.

What I claim as my invention, and desire to secure by Letters Patent, is—

1. A process for the manufacture of accumulator-electrodes, which consists in forming recesses in the metallic body, filling the recesses with a material adapted to furnish resistance to pressure, and then forcing the body through the die of a reducing-press.

2. A process for the manufacture of accumulator-electrodes, which consists in forming laterally-projecting ribs in the metallic body, filling the space between the ribs with active material, and then forcing the body through the die of a reducing-press.

3. A process for the manufacture of accumulator-electrodes, which consists in forming recesses in bodies of lead or other suitable metal or alloy, filling the recesses with active material, and then forcing the body through the die of a reducing-press.

4. A process for the manufacture of accumulator-electrodes from bodies of lead or other metal or alloy, which consists in forming within the bodies laterally-projecting intersecting ribs with intervening spaces, filling the spaces with active material, and then forcing the bodies through the die of a reducing-press.

In testimony whereof I have signed my name to this specification in the presence of two subscribing witnesses.

HEINRICH FRANZ HOBEL.

Witnesses:
  WOLDEMAR HAUPT,
  HENRY HASPER.